(12) United States Patent
Kaeriyama

(10) Patent No.: US 7,692,841 B2
(45) Date of Patent: Apr. 6, 2010

(54) SYSTEM AND METHOD FOR REGULATING MICROMIRROR POSITION

(75) Inventor: Toshiyuki Kaeriyama, Ibaraki (JP)

(73) Assignee: Texas Instruments Incorporated, Dallas, TX (US)

( * ) Notice: Subject to any disclaimer, the term of this patent is extended or adjusted under 35 U.S.C. 154(b) by 90 days.

(21) Appl. No.: 11/831,710

(22) Filed: Jul. 31, 2007

(65) Prior Publication Data

US 2009/0034043 A1 Feb. 5, 2009

(51) Int. Cl.
*G02F 1/02* (2006.01)
*G02B 26/00* (2006.01)
*G02B 27/00* (2006.01)

(52) U.S. Cl. ............... 359/245; 359/290; 359/577

(58) Field of Classification Search ............ 359/245, 359/260–263, 298, 301–303, 317–318, 577, 359/290–292, 223–225, 295, 198, 237, 242
See application file for complete search history.

(56) References Cited

U.S. PATENT DOCUMENTS

| | | | |
|---|---|---|---|
| 5,212,582 A | 5/1993 | Nelson | |
| 5,442,414 A | 8/1995 | Janssen et al. | |
| 5,467,146 A | 11/1995 | Huang et al. | |
| 5,517,347 A | 5/1996 | Sampsell | |
| 6,025,951 A | 2/2000 | Swart et al. | |
| 6,128,077 A | 10/2000 | Jovin et al. | |
| 7,052,143 B2 | 5/2006 | Russell et al. | |
| 7,073,881 B2 | 7/2006 | Silverbrook | |
| 2002/0012000 A1* | 1/2002 | Doherty et al. | ............ 345/204 |
| 2002/0051270 A1* | 5/2002 | Tatsuno et al. | ............ 359/187 |

OTHER PUBLICATIONS

Grimmett, J.D., "Thermal Analysis of a Light Reflecting Digital Micromirror Device," ISPS '97 Proceedings, 1997, pp. 242-247.
"Product Preview Data Sheet: TI DN 2503686: DMD 0.7 XGA 12° DDR DMD Discovery™," Aug. 30, 2005, 20 pp., Texas Instruments Incorporated.

* cited by examiner

*Primary Examiner*—Scott J Sugarman
*Assistant Examiner*—Dawayne A Pinkney
(74) *Attorney, Agent, or Firm*—Charles A. Brill; Wade James Brady, III; Frederick J. Telecky, Jr.

(57) ABSTRACT

A system and method for regulating micromirror position in a digital micromirror device. The system and method adjusts micromirror operating temperature and/or a reset sequence of the micromirror by determining a desired tilt angle, adjusting voltage potentials of signals in a reference reset sequence, and saving the adjusted reset sequence. The adjustments are used to alter a voltage potential difference between micromirrors of the digital micromirror device and respective address lines, thereby allowing for a precise regulation of a tilt angle of the micromirrors. Additionally, the operating temperature of the digital micromirror device may also be controlled to regulate micromirror position. The precise control of the tilt angle of the micromirrors permits the use of digital micromirror devices in systems requiring fine focus and increased focus depth, such as photolithography and holography.

19 Claims, 8 Drawing Sheets

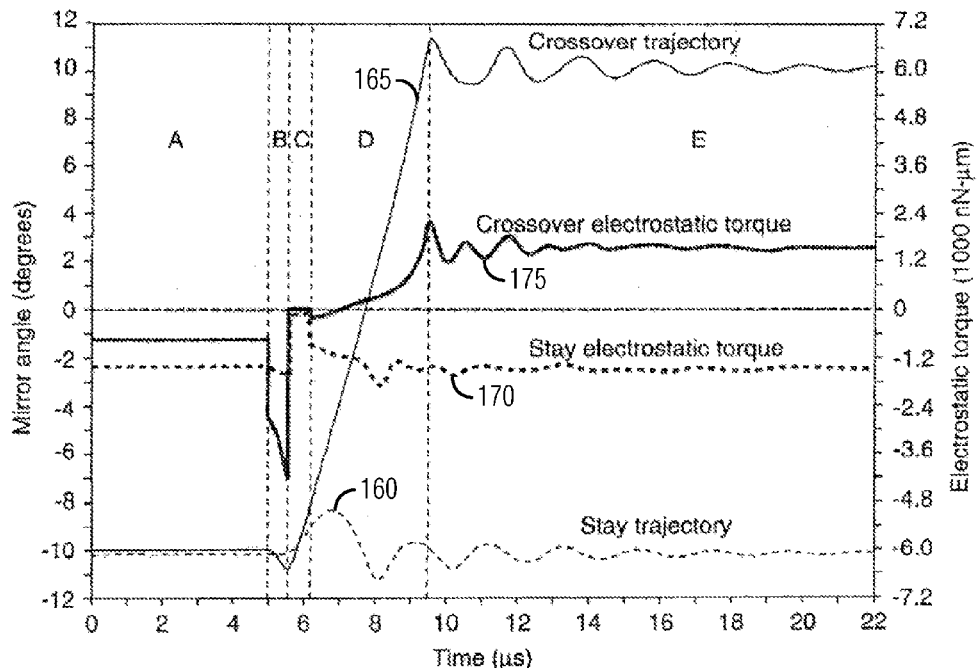
*Fig. 1c*
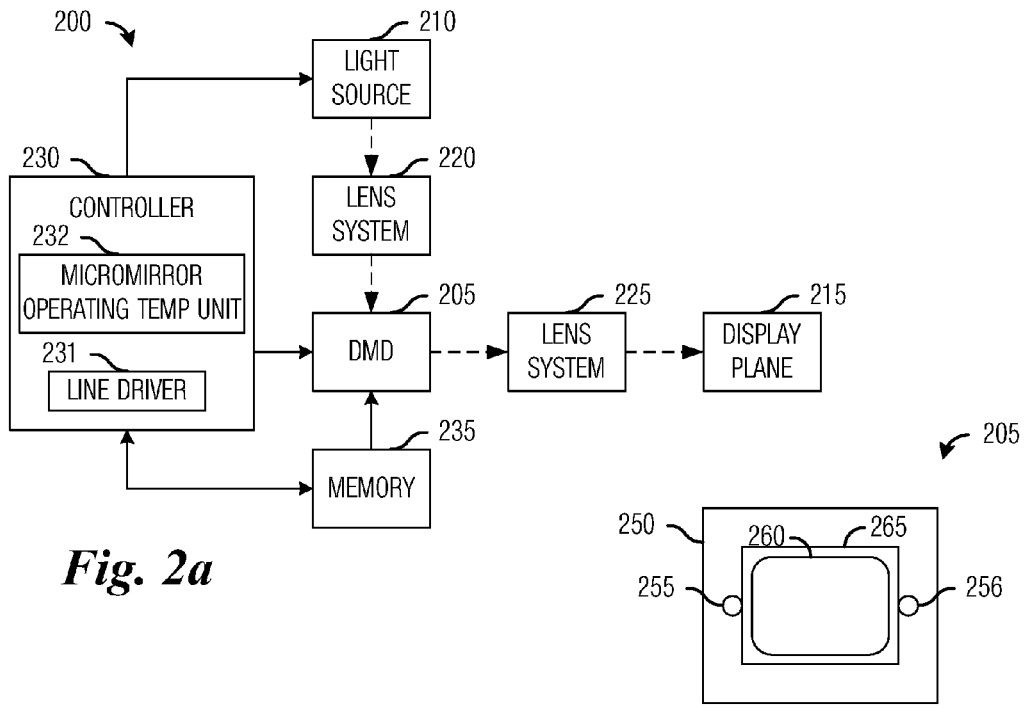
*Fig. 2a*
*Fig. 2b*

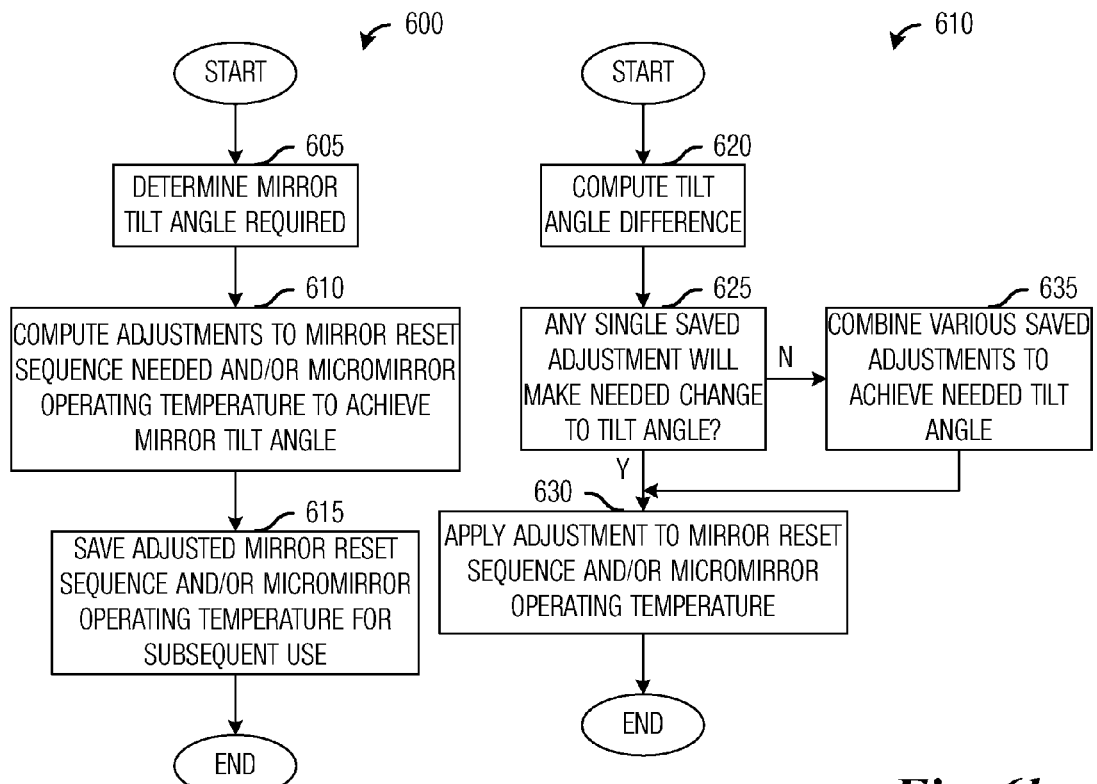
*Fig. 6a*
*Fig. 6b*
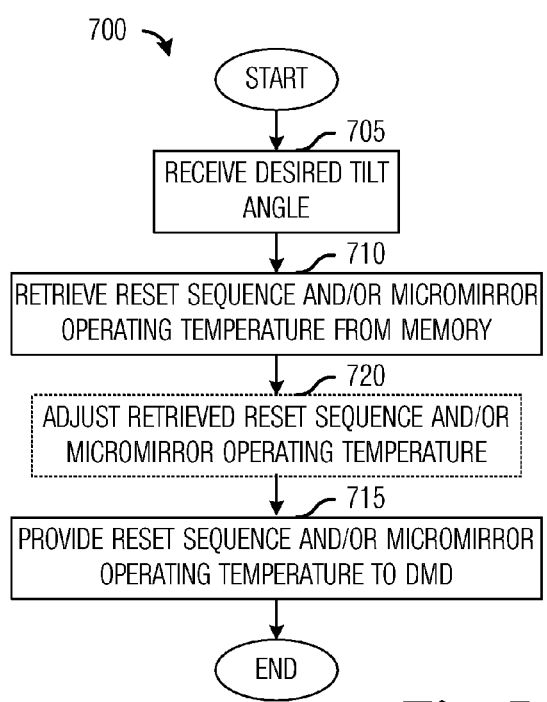
*Fig. 7*

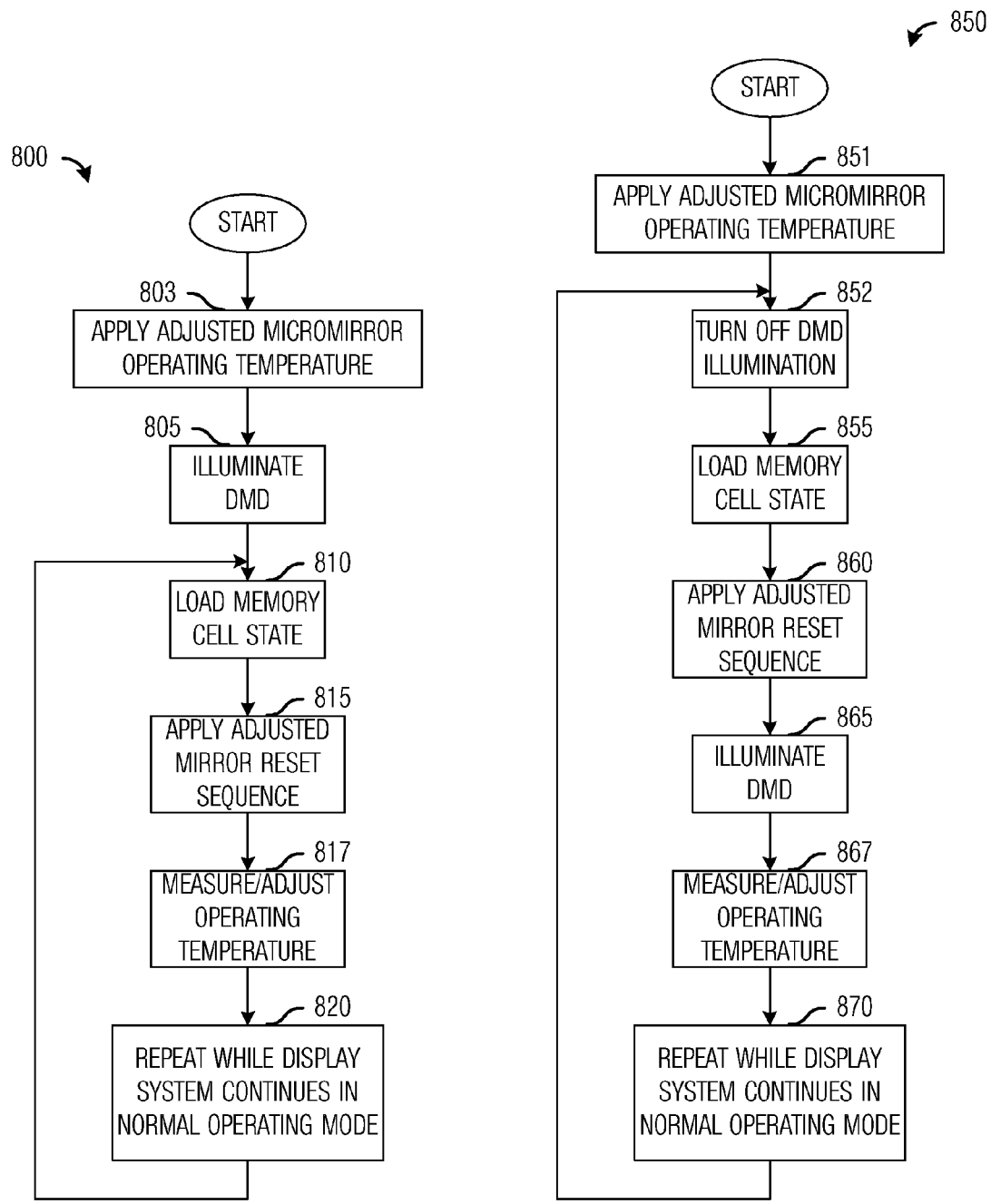
*Fig. 8a*  *Fig. 8b*

SYSTEM AND METHOD FOR REGULATING MICROMIRROR POSITION

TECHNICAL FIELD

The present invention relates generally to a system and method for displaying images, and more particularly to a system and method for regulating micromirror position in a digital micromirror device.

BACKGROUND

A digital micromirror device (DMD) is a form of a microelectrical mechanical system (MEMS) with a large number of micromirrors that individually pivot about an axis based upon the state of associated memory cells. For example, a micromirror may pivot to a first position if an associated memory cell contains a first value, and if the associated memory cell contains a second value, the micromirror may pivot to a second position.

A common use for a DMD is as an array of light modulators in an image display system, wherein the micromirrors in the DMD modulate light from a light source based on image data of an image being displayed. When a micromirror is in a first position, light from the light source reflects onto a display plane, while a micromirror in a second position reflects light away from the display plane. A combination of the micromirrors in the DMD operating in unison creates a projection of the image on the display plane.

In a typical DMD, a first position may correspond to micromirrors coming to rest at +18, +16, +14, +12, or so forth, degrees from a normal of the DMD's surface, and a second position may correspond to micromirrors coming to rest at −18, −16, −14, −12, or so on, degrees from the normal. For applications such as image display using non-coherent light for viewing purposes, a tight tolerance to the rest positions may not be required. Therefore, the tolerance may be as loose as +/− one (1) degree from the rest position.

However, for other applications that make use of a DMD, such a loose tolerance may not be acceptable. For example, in display systems that use laser illumination, a tight tolerance at the rest position of the micromirrors of the DMD may be needed to ensure that coherent light reflecting off the DMD enters a narrow iris and into an optical path of the display system. Similarly, in many emerging applications of DMDs, such as in short wavelength photolithography and holography, a tight tolerance on the rest positions of the micromirrors of the DMD may be required to ensure sharp images, good light intensity, and good depth of focus.

SUMMARY OF THE INVENTION

These and other problems are generally solved or circumvented, and technical advantages are generally achieved, by embodiments of a system and a method for regulating micromirror position in a digital micromirror device.

In accordance with an embodiment, a method for adjusting a reset sequence of a digital micromirror device is provided. The method includes determining a desired tilt angle, adjusting voltage potentials of signals in a reference reset sequence thereby creating an adjusted reset sequence, and saving the adjusted reset sequence. The adjustments alter a voltage potential difference between mirrors of the digital micromirror device and respective address lines and change a potential energy stored in spring tips coupled to the mirrors In accordance with another embodiment, a method for positioning mirrors in a digital micromirror device to a tilt angle is provided. The method includes receiving the tilt angle, altering operating conditions of the digital micromirror device, wherein the altered operating conditions are based on the received tilt angle, and applying the altered operating conditions to the digital micromirror device.

In accordance with another embodiment, a system is provided. The system includes a light source, an array of light modulators positioned in a light path of the light source after the light source, and a controller electronically coupled to the array of light modulators and to the light source. The array of light modulators produces images by modulating light from the light source based on image data on a display plane; and the controller loads image data into the array of light modulators and alters a reset sequence to the array of light modulators, wherein the reset sequence is altered to achieve a desired tilt angle for micromirrors in the array of light modulators.

An advantage of an embodiment is that existing DMD designs may be utilized without significant changes to support hardware, and therefore, the embodiment may be realized without major revisions to existing DMD designs. This may help to keep the development costs down. Furthermore, without requiring significant modifications to existing DMD designs, the embodiment may be implemented in a relatively short amount of time.

A further advantage of an embodiment is that the tolerance of the micromirror rest position may be adjusted as needed. Therefore, a single DMD design may be utilized for a wide range of applications. This may help to keep development and product costs as low as possible since a single DMD design may be used for a number of applications rather than having to develop multiple DMD designs to support products having different tolerance requirements.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the embodiments, and the advantages thereof, reference is now made to the following descriptions taken in conjunction with the accompanying drawings, in which:

FIG. 1a is a diagram of a high-level side view of a typical micromirror of a digital micromirror device;

FIGS. 1b and 1c are diagrams of an exemplary reset sequence along with micromirror tilt angle and electrostatic torque;

FIG. 2a is a diagram of an exemplary display system;

FIG. 2b is a diagram of a packaged digital micromirror device;

FIGS. 6a and 6b are diagrams of algorithms for computing reset sequences;

FIG. 7 is a diagram of an algorithm for selecting a reset sequence based on desired micromirror tilt angle; and FIGS. 8a and 8b are diagrams of the operation of a display system.

DETAILED DESCRIPTION OF ILLUSTRATIVE EMBODIMENTS

Figure 1B:
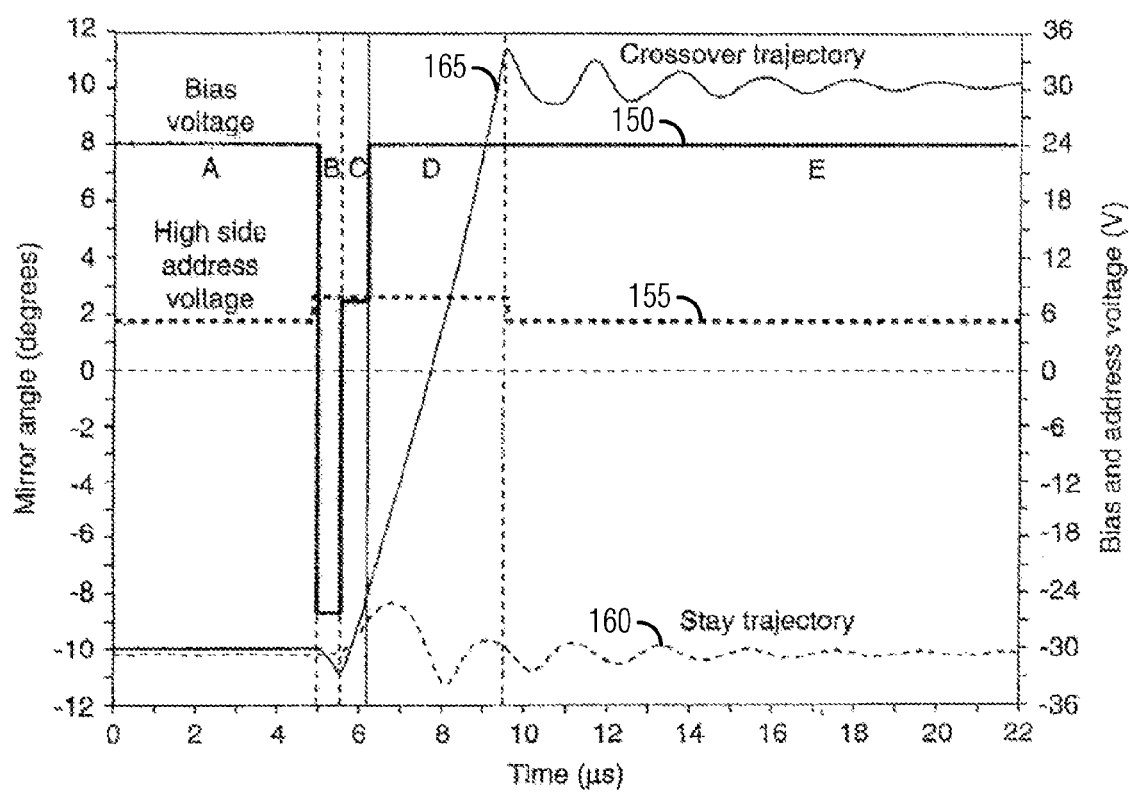

The making and using of the embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The embodiments will be described in a specific context, namely a digital micromirror device used in an image display system that requires a tight micromirror rest position tolerance. The invention may also be applied, however, to other applications that make use of digital micromirror devices, such as short wavelength photolithography and holography, as well as phase modulators and optical switches.

FIG. 1a illustrates a high-level side view of a micromirror structure of a DMD 100 with support circuitry. A micromirror structure includes a micromirror 105 having a mirror surface 103, which may be a planar surface coated with a reflective surface such as aluminum. The micromirror 105 may be mounted on a support structure and pivot about an axis, for example, a hinge. Depending on the design of the micromirror 105, the micromirror 105 may land on landing electrodes 110, a support structure of the micromirror 105 may land on the landing electrodes 110, or the micromirror 105 may land on a supporting structure formed from or with the landing electrodes 110. A first address electrode 115 and a second address electrode 120 may be utilized to create an electrostatic potential that may be used to cause the micromirror 105 to move towards either the first address electrode 115 or the second address electrode 120.

The micromirror 105 and the landing electrodes 110 may be kept at the same voltage potential, referred to as a bias voltage, while the first address electrode 115 and the second address electrode 120 may be at a voltage potential, such as 0 V, 3.3 V, 5 V, or so forth. Depending on the voltage potential difference between the first address electrode 115 and the micromirror 105 and between the second address electrode 120 and the micromirror 105, the micromirror 105 may be attracted to the address electrode with a greater voltage potential difference. For example, if the bias voltage is equal to about 24 V and the first address electrode 115 is equal to about 0 V and the second address electrode 120 is equal to about 3.3 V, then the micromirror 105 will be attracted to the first address electrode 115 because there is about a 24 V voltage potential difference between the micromirror 105 and the first address electrode 115, and only about a 20.7 V voltage potential difference between the micromirror 105 and the second address electrode 120. Other voltage values may be used and the discussion of voltage values herein should not be construed as being limiting to either the scope or the spirit of the present invention.

When the micromirror 105 moves towards either the first address electrode 115 or the second address electrode 120, the movement of the micromirror 105 may be stopped when spring tips located on the micromirror 105 or a support structure of the micromirror 105 land on the landing electrodes 110, or when the micromirror 105 lands on spring tips extended from a supporting structure built or formed on the landing electrode 110. Spring tips may be made from a thin and flexible material, such as a metallic material. Examples of materials that may be used to create spring tips may be aluminum, copper, tin, and alloys thereof. As the spring tips make contact with the landing electrodes 110, the spring tips compress and store the kinetic energy of the micromirror 105 as potential energy. The micromirrors 105 stop their motion once the energy required to compress the spring tips roughly equals the attractive force on the micromirror 105 from the voltage potential difference with either first address electrode 115 or the second address electrode 120.

An address electrode that attracts the micromirror 105 due to a greater voltage potential difference may be referred to as a low-side electrode, while an address electrode that attracts the micromirror 105 to a lesser degree due to a smaller voltage potential difference may be referred to as a high-side electrode. For example, when the micromirror 105 is in a position corresponding to position 125, then the first electrode 115 may be referred to as the low-side electrode and the second electrode 120 may be referred to as the high-side electrode. When the micromirror 105 is in a position 130, then the second electrode 120 may be referred to as the low-side electrode and the first electrode 115 may be referred to as the high-side electrode.

FIG. 1b illustrates an exemplary reset sequence used to set a micromirror state. The reset sequence involves applying a reset pulse on a bias voltage signal line (the micromirror 105 and the landing electrodes 110) as well as setting appropriate voltage potentials on the first address electrode 115 and the second address electrode 120. A first trace 150 illustrates the bias voltage applied on the bias voltage signal line, and a second trace 155 illustrates a voltage potential of either the first address electrode 115 or the second address electrode 120. The voltage values shown in the first trace 150 and the second trace 155 are with respect to a common voltage reference. The address electrode that may receive the higher voltage value may be referred to as a high-side address electrode because the voltage potential difference between the micromirror 105 and the address electrode is smaller than a voltage potential difference between the micromirror 105 and an address electrode receiving a lower voltage value. The micromirror 105 will be attracted less to side with the lower voltage potential difference between the micromirror 105 and one of the address electrodes. Then, a corresponding side of the micromirror 105 will be further away from the high-side address electrode (higher in relation to the surface of the digital micromirror device) than a side of the micromirror 105 that is attracted to the address electrode with the lower voltage value.

The reset sequence may be partitioned into five distinct stages, labeled A-E in FIG. 1b. A first stage, labeled "A" in FIG. 1b, may correspond to a memory write stage, wherein a value for a memory cell corresponding to a micromirror may be assigned a value. Depending on the value of the memory write, the voltage potential of the first address electrode 115 and the second address electrode 120 may be set to either 0 V and 3.3 V or 5 V. A second stage, labeled "B" in FIG. 1b, may correspond to a reset stage, and may involve an assertion of a reset pulse on the bias voltage signal line, shown as Vb in FIG. 1a. For example, the reset pulse may include a −24 V potential on the bias voltage signal line, Vb. The second stage may be used to store additional kinetic energy into spring tips by adding a potential impulse to the bias voltage signal line. Although the discussion provides an exemplary reset pulse with a 24 V potential, the reset pulse may utilize other voltage potentials A third stage of the reset sequence, labeled "C" in FIG. 1b, may correspond to a release and differentiation stage. The third stage may involve the release of the micromirror 105 from the biased condition on the bias voltage signal line Vb and may be used to help differentiate the transition of the micromirror 105. A fourth stage, labeled "D" in FIG. 1b, may correspond to an acceleration of rotation and landing of the micromirror 105 when the micromirror 105 performs a change of state (a crossover transition), or suppression of the micromirror 105 from releasing when the micromirror 105 remains in a same state (a stay transition). The fourth stage may also correspond to the settling down or stabilization of the micromirror 105. The micromirror 105 may perform a crossover transition wherein the micromirror 105 changes from a first position to a second position, corresponding to a change in the value in the memory cell. The micromirror 105 may alternatively perform a stay transition wherein the micromirror 105 remains in the same position, corresponding to no change in the value in the memory cell. A third trace 160 displays a stay transition. Although the position of the micromirror 105 does not change, the assertion of the reset pulse on the bias voltage signal line (stages B and C) may cause the micromirror 105 to jitter (or exhibit transient response). A fourth trace 165 displays a crossover transition. A fifth stage, labeled "E" in FIG. 1b, may correspond to the micromirror 105 settling after performing its transition, either a crossover or a stay transition.

FIG. 1c illustrates electrostatic torque during the exemplary reset sequence. A first trace 170 illustrates electrostatic torque occurring during a stay transition, and a second trace 175 illustrates electrostatic torque occurring during a crossover transition. The electrostatic torque (negative in polarity) occurring during the stay transition helps to keep the micromirror 105 in its current position, with an exception during the second and third stages of the reset sequence, during which the reset pulse causes the micromirror 105 to jitter (or exhibit transient response). During a crossover transition, a positive polarity electrostatic torque helps to transition the micromirror 105 to a different state (position).

With reference now to FIG. 2a, there is shown a diagram illustrating a view of an exemplary DMD-based projection display system 200. The DMD-based projection display system 200 includes a DMD 205 that modulates light produced by a light source 210. The DMD 205 is an example of a microdisplay. Other examples of microdisplays may include transmissive or reflective liquid crystal, liquid crystal on silicon, deformable micromirrors, and so forth. In a microdisplay, an array of light modulators may be arranged in a rectangular, square, diamond shaped, and so forth, array. Each light modulator in the microdisplay may operate in conjunction with the other light modulators to modulate the light produced by the light source 210. The light, modulated by the DMD 205, may be used to create images on a display plane 215. The DMD-based projection display system 200 also includes a first lens system 220, which may be used to collimate the light produced by the light source 210 as well as collect stray light, and a second lens system 225, which may be used to manipulate (for example, focus) the light reflecting off the DMD 205.

The DMD 205 may be coupled to a controller 230, which may be responsible for loading image data into the DMD 205, controlling the operation of the DMD 205, controlling the light produced by the light source 210, and so forth. A memory 235, which may be coupled to the DMD 205 and the controller 230, may be used to store the image data, as well as configuration data, color correction data, reset sequence data, operating temperature data, and so forth.

As discussed above, the controller 230 may move the micromirrors of the DMD 205 by applying a reset sequence and setting desired values in memory cells associated with each of the micromirrors. Depending on the value of the bias voltage, the voltage potentials between the address electrodes and the micromirrors, the state of the memory cells, and so forth, each micromirror's tilt angle may be controlled. For example, increasing a steady state value of the bias voltage may increase the voltage potential between a micromirror and its address electrodes. The increased voltage potential may create a greater attractive force between the micromirror and the address electrodes of the micromirror, thereby increasing a compression of the micromirror's spring tip(s) and altering the tilt angle of the micromirror. A similar result may be achieved by altering the voltage potential of the address electrodes.

The controller 230 includes a line driver 231 that may be used to assert the needed voltage levels on the various signal lines in the DMD 205. For example, the line driver 231 may assert the bias voltage values, voltage potentials on the address electrodes, the state of the memory cells, and so forth. The line driver 231 may be capable of asserting specific values on the different signal lines, such as 20 V, 25 V, 30 V, 3.3 V, 7.5 V, and so forth, in order to maintain simplicity. Alternatively, the line driver 231 may be capable of asserting any voltage value within a specified range onto the different signal lines. The ability to assert a wide range of voltage values may increase the ability of the controller 230 to regulate the tilt angle of the micromirrors.

The controller 230 may also include a micromirror operating temperature unit 232. The micromirror operating temperature unit 232 may be used to determine the operating temperature of the micromirrors in the DMD 205. In addition to determining the operating temperature of the micromirrors, the micromirror operating temperature unit 232 may also alter the operating temperature of the micromirrors. The operating temperature detection may be made using a semiconductor thermometer, a thermistor, thermocouple, resistance thermal detectors, infrared thermometers, bimetal thermometers, and so forth. For instance the DMD 205 may have several thermocouples positioned at different locations of its packaging, the operating temperature may be computed from the measurements provided by the thermocouples.

FIG. 2b illustrates a top view of the DMD 205 in an exemplary package 250. The package 250 may include several thermocouples, such as a first thermocouple 255 and a second thermocouple 256 positioned on opposite sides of an opening 260 in the package 250. The opening 260 enables light from the light source 210 to enter the package 250 and to be modulated by micromirrors of the DMD 205. The opening 260 may be sealed by an optically transparent cap 265. The first thermocouple 255 and the second thermocouple 256 may provide temperature information related to a thermal load of the DMD 205 from the light source 210. The package 250 may also include thermocouples located on a backside as well as other locations of the package 250.

For example, utilizing temperature information from the first thermocouple 255 and the second thermocouple 256, as well as from a thermocouple located on the backside of the package 250, it may be possible to compute a temperature of the micromirror array in the DMD 255 using an expression:

$$T_{array} = T_{ceramic} + (Q_{array} * R_{array\_to\_ceramic})$$

where $T_{array}$ is the temperature of the micromirror array, $T_{ceramic}$ is the temperature of the package 250, $Q_{array}$ is the total array power in watts and may be dependent on electrical power provided into the DMD array as well as absorbed power from incident illumination power (the power of the light source 210, for example), and $R_{array\_to\_ceramic}$ to ceramic is the thermal resistance of the package 250 from the micromirror array to the external ceramic (° C./Watt).

The operating temperature of the DMD 205 may be controlled by altering the performance of a cooling system of the display system 200 and the DMD 205. $T_{ceramic}$ may be determined by $Q_{array}$, an ambient temperature, and thermal resistance of ceramic-to-ambient. The $T_{ceramic}$ (the temperature of the package 250) may be made variable and controlled by design of a cooling system. For example, to raise the temperature of the DMD 205, the cooling system of the display system 200 and/or that of the DMD 205 may be operated differently so that the cooling system does not operate as effectively. For example, a fan speed of a cooling fan may be turned down so that the cooling fan moves less air over a heat sink of the DMD 205, thereby increasing the operating temperature of the DMD 205. Similarly, increasing the fan speed may reduce the operating temperature of the DMD 205.

The controller 230 may then modify line drive voltages and/or the operating temperature of the DMD 205 to control the micromirror's tilt angle. The controller 230 may alter the line drive voltages through the use of the line driver 231 and the operating temperature of the DMD 205 through the use of the micromirror operating temperature unit 232. The controller 230 may use either adjustments to line drive voltages or operating temperature or both to control the tilt angle of micromirrors of the DMD 205. A detailed description of several exemplary techniques for controlling the micromirror's tilt angle using line drive voltages and/or operating temperature is presented below.

Figure 3A:
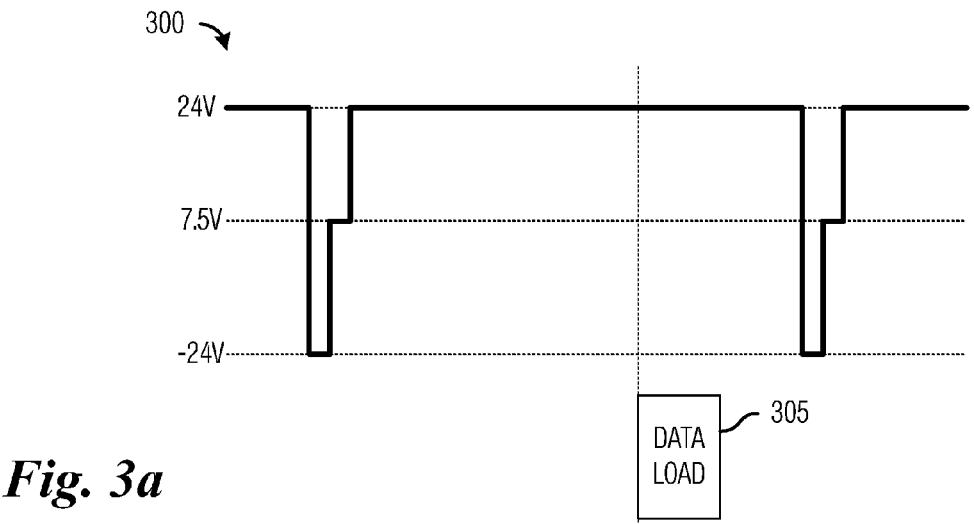
FIG. 3a is a diagram of an exemplary reset sequence including a flip of a memory cell's state.

FIG. 3a illustrates an exemplary reset sequence 300 with a data load 305 used to flip a memory cell's state. The data load 305 may occur after a reset pulse (stage E) of the reset sequence 300. The data load 305 may need to be sufficiently delayed to ensure that the micromirror transitions to a state consistent with the desired state of the micromirror. The data load 305 may load into a memory cell of the micromirror a value that is complementary to the value currently stored in the memory cell, for example.

Figure 3B:
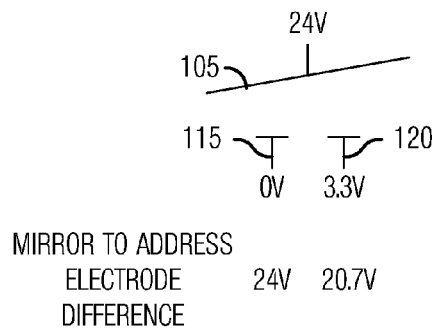
FIGS. 3b and 3c are diagrams of the effect of the memory cell state flip on the position of the micromirror.
Figure 3C:
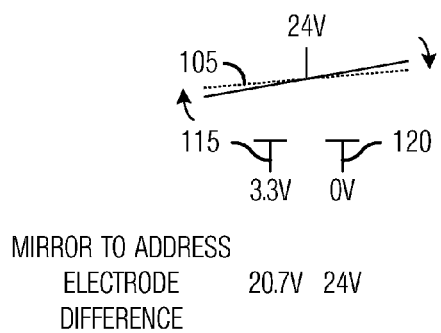

The diagrams shown in FIGS. 3b and 3c illustrate the effect of flipping a memory cell state on the micromirror's tilt angle. The diagram shown in FIG. 3b illustrates the micromirror 105 in a landed state after the occurrence of a reset pulse of a reset sequence, with the micromirror 105 tilting towards an electrode with which it has a greater voltage potential difference. As shown in FIG. 3b, the micromirror 105 has a greater voltage potential difference with the first address electrode 115 than the second address electrode 120. However, after the micromirror 105 has settled, a data load may be used to reverse the state of the memory cell. This may have the effect of reversing the voltage levels on the first address electrode 115 and the second address electrode 120. Now, there is a greater voltage potential difference between the micromirror 105 and the second address electrode 120. However, the voltage potential difference between the micromirror 105 and the second address electrode 120 may not be sufficiently large to cause the micromirror 105 to transition completely back towards the second address electrode 120. Rather, the micromirror 105 moves a small amount back towards the second address electrode 120, as shown in FIG. 3c.

It may be possible to alter the attractive force between a micromirror and the micromirror's address electrodes by adjusting the bias voltage applied to the micromirror and the micromirror's landing electrodes, modulating the bias voltage, adjusting the voltage potential of the address electrodes, and flipping the micromirror's memory cell's state while the micromirror is settling. The attractive force between the micromirror and the address electrodes may then translate to the tilt angle of the micromirror.

Table 1, shown below, illustrates simulated values of spring tip bending, micromirror tilt angle, and micromirror tilt angle change before and after a memory state flip in an exemplary DMD. The memory state flip may occur while the micromirror is settling after making a transition. The memory state flip may reduce the attractive forces between the micromirror and the address electrodes, thereby reducing the micromirror tilt angle.

TABLE 1

Spring tip, micromirror tilt angle, and micromirror tilt angle before and after a memory state flip.

| Bias Voltage (V) | Memory Cell Voltage (V) | Bending of Spring Tip (um) | Bending of Spring Tip After Memory State Flip (um) | Micromirror Tilt Angle (degrees) | Micromirror Tilt Angle After Memory State Flip (degrees) | Micromirror Tilt Angle Change (degrees) |
|---|---|---|---|---|---|---|
| 20 | 3.3 | 0.0605 | 0.037 | 0.492 | 0.301 | 0.191 |
| 20 | 7.5 | 0.0624 | 0.00154 | 0.508 | 0.123 | 0.384 |
| 25 | 3.3 | 0.0976 | 0.0677 | 0.794 | 0.551 | 0.243 |
| 25 | 7.5 | 0.1 | 0.0384 | 0.815 | 0.815 | 0.313 |
| 30 | 3.3 | 0.143 | 0.107 | 1.16 | 0.867 | 0.295 |
| 30 | 7.5 | 0.146 | 0.0698 | 1.19 | 0.568 | 0.618 |

Also shown in Table 1 is the effect of the bias voltage and the memory cell voltage (directly related to the voltage potential on the address electrodes) on the micromirror tilt angle. The micromirror tilt angle increases with increasing bias voltage or memory cell voltage. Furthermore, increasing both bias voltage and memory cell voltage result in a greater increase in micromirror tilt angle.

Table 2, shown below, illustrates simulated values of spring tip and micromirror tilt angle change rate by bending before and after a memory state flip. Once again, the effect on the voltage potential difference caused by the memory state flip reduces the attractive forces between the micromirror and the address electrodes, thereby reducing the bending rate and the micromirror tilt angle.

TABLE 2

Spring tip and micromirror tilt angle change rate by bending before and after a memory state flip.

| Bias Voltage (V) | Memory Cell Voltage (V) | Bending Rate of Spring Tip by Bias Voltage (um/V) | Micromirror Tilt Angle Change Rate by Bias Voltage (degrees/V) | Bending Rate of Spring Tip by Bias Voltage After Memory State Flip (um/V) | Micromirror Tilt Angle Change Rate by Bias Voltage After Memory State Flip (degrees/V) |
| --- | --- | --- | --- | --- | --- |
| 20 | 3.3 | 0.00484 | 0.0394 | 0.00296 | 0.0241 |
| 20 | 7.5 | 0.005 | 0.0406 | 0.0012 | 0.0099 |
| 25 | 3.3 | 0.0056 | 0.0454 | 0.00387 | 0.0315 |
| 25 | 7.5 | 0.00572 | 0.0466 | 0.00219 | 0.0179 |
| 30 | 3.3 | 0.00635 | 0.0517 | 0.00474 | 0.0386 |
| 30 | 7.5 | 0.00647 | 0.0527 | 0.0031 | 0.0252 |

Figure 3D:
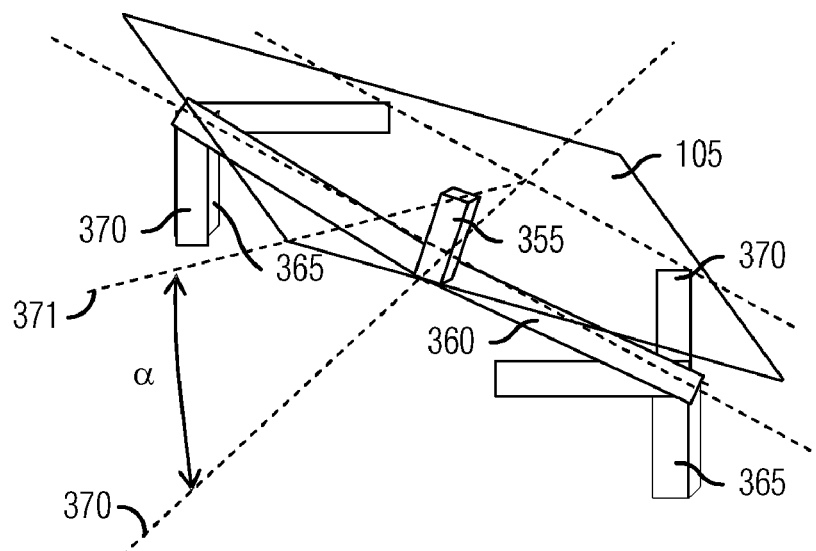
FIGS. 3d and 3e are diagrams of the effect of micromirror operating temperature on micromirror position.
Figure 3E:
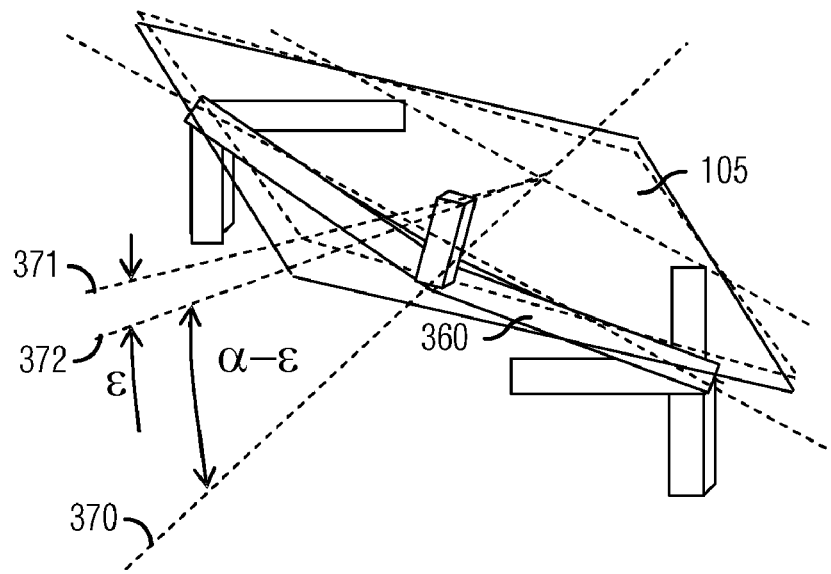

In addition to altering the tilt angle of a micromirror by altering the attractive forces between a micromirror and the micromirror's address electrodes, the operating temperature of the DMD 100 may also have an effect on the tilt angle of the micromirror. With reference now to FIGS. 3d and 3e, there are shown diagrams illustrating the effects of operating temperature on a micromirror's tilt angle. FIG. 3d illustrates an isometric view of a single micromirror 105 and its support structure. The micromirror 105 is shown in outline to enable the viewing of the support structure of the micromirror 105. The support structure of the micromirror 105 may include a post 355 coupling the micromirror 105 to about a middle of a hinge 360. The hinge 360 may enable the micromirror 105 to pivot about the hinge 360 to land at one of two positions, depending on an electrostatic potential difference between the micromirror 105 and address electrodes underneath the micromirror 105. The hinge 360 may be coupled to hinge support posts 365 that suspend the hinge 360 and the micromirror 105 above a substrate of the DMD 205. The micromirror 105 may come to a rest on spring tips 370, which may deform (bend) to store the kinetic energy of the micromirror 105 as potential energy.

An angle, α, formed between a first line 370 and a second line 371, represents the tilt angle of the micromirror 105. The first line 370 may be parallel to an underlying substrate and the second line 371 may be representative of the micromirror 105 being in one of its two stop positions. As the operating temperature of the DMD 205 increases, the hinge 360 begins to expand and may begin to sag. As the hinge 360 sags (as shown in FIG. 3e), the tilt angle of the micromirror 105 decreases. The tilt angle decreases because the middle of the micromirror 105 may be lowered as the hinge 360 sags, but the edge of the micromirror 105, as held by the spring tips 370, remains in position. A third line 372 represents an angle of the micromirror 105 after the hinge 360 has sagged due to lengthening due to increased operating temperature. A difference between the second line 371 and the third line 372 may represent an angle, ε, and the resulting tilt angle of the micromirror 105 may now be α−ε. Simulation results utilizing typical materials used in production DMDs and typical DMD models have shown that if the operating temperature of the DMD 205 increases by 10 degrees Celsius, the tilt angle of the micromirror 105 may decrease by about 0.03 degrees.

Figure 4A:
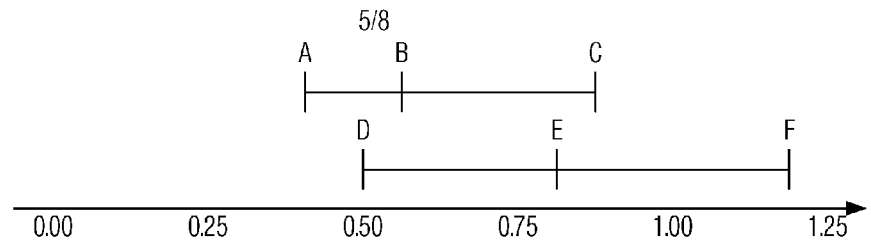
FIGS. 4a and 4b are diagrams of a range of micromirror tilt angles realizable utilizing changes in micromirror operating temperature and voltage potentials of a reset sequence.

With reference now to FIG. 4a, there is shown a diagram illustrating an achievable range of micromirror tilt angles utilizing changes in bias voltage, memory cell voltage level, memory cell state flipping, and bias voltage modulation of a reset sequence. Using these techniques for altering the voltage potential difference between the micromirror and address electrodes, it may be possible to alter the tilt angle of a micromirror within a range of about 0.9 degrees (+/−0.45 degrees). Achievable micromirror tilt angles may range from a low of about 0.30 degrees with a combination of a memory cell state flip, a bias voltage of 20 V, a memory cell voltage level of 3.3 V (shown as point A in FIG. 4a) to a high of about 1.19 degrees with a combination of a bias voltage of 30 V and a memory cell voltage level of 7.5 V (shown as point F in FIG. 4a). Other points in FIG. 4a include: point B—0.55 degrees with a memory cell state flip, a bias voltage of 25 V, and a memory cell voltage level of 3.3 V; point C—0.87 degrees with a memory cell state flip, a bias voltage of 30 V, and a memory cell voltage level of 3.3 V; point D—0.49 degrees with a bias voltage of 20 V and a memory cell voltage level of 3.3 V; and point E—0.79 degrees with a bias voltage of 25 V and a memory cell voltage level of 3.3 V. Other micromirror tilt angles may be achievable using other possible combinations of the listed techniques.

Figure 4B:
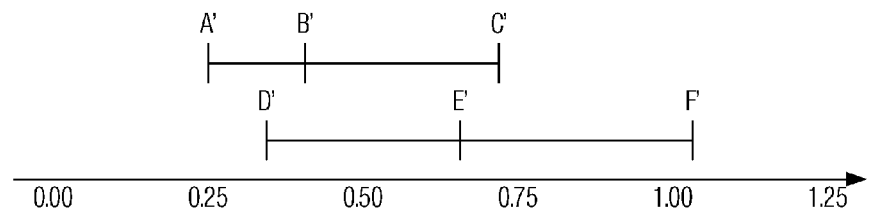

In addition to regulating the tilt angle of the micromirrors in a DMD by altering bias voltage, memory cell voltage level, memory cell state flipping, and bias voltage modulation of a reset sequence, it may be further possible to regulate the tilt angle of the micromirrors of a DMD by setting the operating temperature of the micromirrors of the DMD. FIG. 4b illustrates a diagram of achievable micromirror tilt angles utilizing changes in the operating temperature of the micromirrors of a DMD along with changes in bias voltage, memory cell voltage level, memory cell state flipping, and bias voltage modulation of a reset sequence. For example, point A' may correspond to an operating temperature that may be higher than an operating temperature corresponding to data point A shown in FIG. 4a along with a memory cell state flip, a bias voltage of 20 V, and a memory cell voltage level of 3.3 V. Other data points shown in FIG. 4b correspond to similarly labeled data points shown in FIG. 4a with a different micromirror operating temperature. The diagrams shown in FIGS. 4a and 4b illustrate that the changes in micromirror tilt angle utilizing voltage level changes remain substantially consistent independent of operating temperature.

Figure 5A:
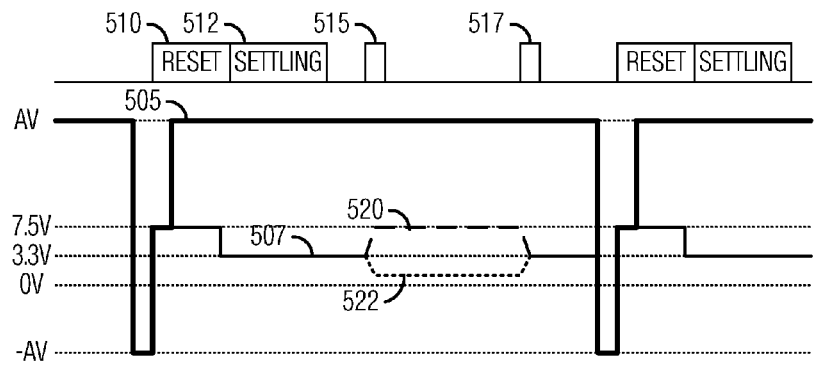
FIGS. 5a through 5e are diagrams of exemplary reset sequences.

With reference now to FIGS. 5a through 5e, there are shown diagrams illustrating exemplary reset sequences, wherein the reset sequences include techniques for regulating micromirror tilt angle. The diagram shown in FIG. 5a illustrates an exemplary reset sequence, wherein a memory cell state flip may be used in combination with altering bias voltage level and memory cell voltage level to regulate micromirror tilt angle. The reset sequence includes a bias voltage signal 505 and a high-side voltage signal 507 for application on the high-side electrode. The bias voltage signal 505 may have a magnitude of about +A V to −A V, wherein A may be 20 V, 25 V, 30 V, and so forth. Furthermore, the high-side voltage signal 507 may have magnitudes ranging from about 3.3 V, 5V, 7.5 V, and so forth. Although the discussion focuses on specific examples for the magnitude of the bias voltage signal 505 and the high-side voltage signal 507, the magnitude of the bias voltage signal 505 and the high-side voltage signal 507 may be about equal to other values. Therefore, the discussion should not be construed as being limiting to either the spirit or the scope of the embodiments.

The reset sequence may be partitioned into several periods. A first period may correspond to a reset period 510 that may correspond to an application of a reset signal and the micromirrors moving to a position corresponding to the states of their respective memory cells. A second period may correspond to a settling period 512 that may correspond to a settling down of the movement of the micromirrors. During the reset period 510 and the settling period 512, the state of the memory cells may have an impact on the final position of the micromirrors as well as their settling time.

However, after the settling period 512, the state of the memory cells may be altered without negatively impacting the final position of the micromirrors or the micromirror's settling time. Therefore, it may be possible to flip the memory cell state after the settling period 512 expires. Block 515 illustrates an exemplary time during the reset sequence when the memory cell state may be flipped.

In general, the loading of memory cell states may take a finite amount of time, thus it may be required to begin loading the memory cell states a certain amount of time before another reset sequence is applied. This may help to ensure that all memory cell states are loaded and steady when a reset pulse is applied. Block 517 illustrates an exemplary time during the reset sequence when the loading of the memory cell states may begin. After the beginning of the loading of the memory cell states, it may not be possible to alter the memory cell voltage levels until after the settling period of the subsequent reset sequence, since doing so may result in micromirrors moving to incorrect positions.

However, in between the block 515 (Memory cell state flipping) and block 517 (Loading of memory cell states), it may be possible to step up or increase (voltage level 520) or step down or decrease (voltage level 522) the high-side electrode's voltage level to change or alter the voltage potential difference between the micromirror and the address electrodes to alter the micromirror's tilt angle. The step up (increase) and step down (decrease) of the high-side electrode's voltage level may be limited to being within a range of voltage values to ensure that proper function of the memory cell's SRAM transistor is maintained. The range of voltage values may be dependent on the device characteristics of the SRAM transistor, manufacturing processes and variations, and so forth. Although the diagram shown in FIG. 5a includes the memory cell state flipping (block 515), the memory cell state flipping may be omitted.

Figure 5B:
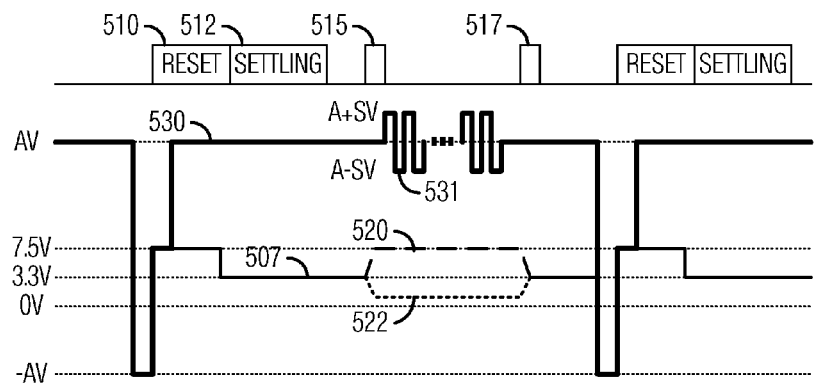
Figure 5C:
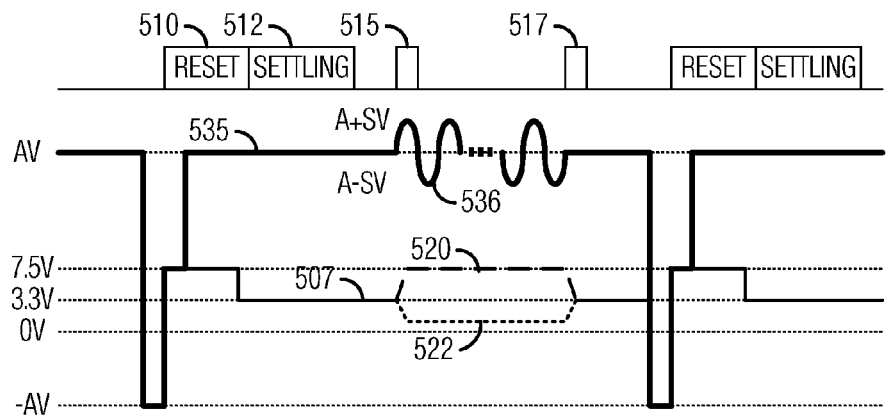

The diagram shown in FIG. 5b illustrates an exemplary reset sequence, wherein bias voltage modulation may be used in combination with memory cell state flip, altering or changing bias voltage level, and memory cell voltage level to regulate micromirror tilt angle. Rather than keeping the bias voltage level substantially level during the reset sequence, with exception of the reset pulse, as shown with the bias voltage signal 505, the diagram shown in FIG. 5b illustrates a bias voltage signal 530 with digital modulation, shown as wave 531. The diagram shown in FIG. 5c illustrates a bias voltage signal 535 with analog modulation, shown as wave 536. The modulation of the bias voltage signal using digital modulation (the bias voltage signal 530 of FIG. 5b) and/or analog modulation (the bias voltage signal 535 of FIG. 5c) may enable a changing of the micromirror tilt angle as well as a modulation of a deflection angle for reflected light reflecting from the surface of the micromirror. Furthermore, a diffraction condition that exists when using coherent light may also be modulated, thereby helping to alleviate speckles. The magnitude of the modulation (both digital and/or analog) may range from a small modulation voltage in the range of fractions of a volt, from 0.1 to 0.5 volts, to a large modulation voltage in the range of several volts, from 4 to 8 volts, for example. The magnitude of the modulation should not be so great as to create an electric potential difference that may produce an electrostatic attractive force that may damage the micromirror 105. The modulation frequency may differ based on application specific requirements; however, the modulation frequency should be substantially higher than the micromirror state switching frequency. As previously discussed, the modulation of the bias voltage signal may be used with or without a memory cell state flip. The diagrams shown in FIGS. 5b and 5c illustrate a memory cell state flip.

Figure 5D:
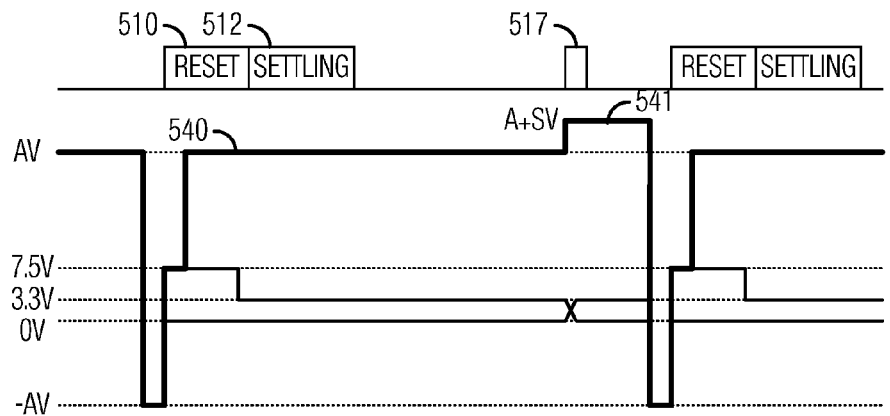
Figure 5E:
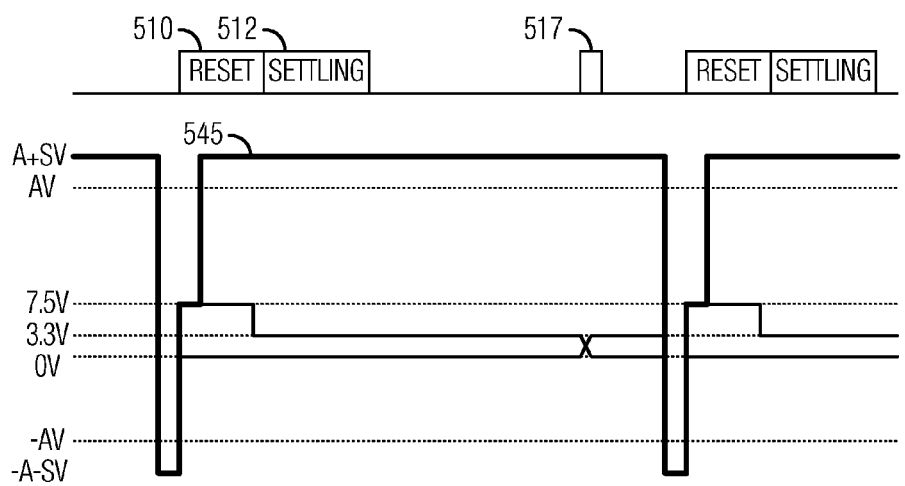

The diagram shown in FIG. 5d illustrates an exemplary reset sequence wherein a bias voltage signal 540 may include a step up in voltage level (shown as step 541) from a value of about +A V to +(A+S) V in order to compensate for a decrease in micromirror tilt angle resulting from a memory cell state flip. The step 541 may occur with the loading of memory cell states, as initiated by block 517. The value of the step up in voltage should be approximately equal to an operating voltage of the memory cell associated with the micromirror 105. The diagram shown in FIG. 5e illustrates an exemplary reset sequence wherein a magnitude of a bias voltage signal 545 has been increased to about +(A+S) V from about +A V to provide compensation for a decrease in micromirror tilt angle resulting from a memory cell state flip.

With reference now to FIGS. 6a and 6b, there are shown diagrams illustrating an algorithm 600 for computing a reset sequence required to achieve a desired micromirror tilt angle and a detailed view of the computing of the reset sequence. The computation of a reset sequence (or reset sequences) to achieve a desired micromirror tilt angle may be performed by a manufacturer of a DMD and then stored in the memory 235 for use by the controller 230. The computation may be performed once for an entire line of DMDs. Alternatively, the computation of the reset sequence (or reset sequences) may be performed for each individual DMD during the manufacture of a DMD, for example, during a performance test, and then stored in the memory 235 for use by the controller 230. In yet another alternative embodiment, the computation of the reset sequence (or reset sequences) may be performed during the manufacture of a display system containing a DMD and then stored in the memory 235 for use by the controller 230.

The computation may begin with a determining of a required micromirror tilt angle (block 605). Then, using the required micromirror tilt angle, adjustments to micromirror operating temperature and/or to voltage potential levels of a reference reset sequence may be computed (block 610).

Adjustments to the reference reset sequence may include adjustments to a bias voltage level, memory cell state flipping, adjustments to memory cell voltage levels, modulating a bias voltage, and so forth. The adjusted micromirror temperature and/or adjusted reset sequence may then be stored for subsequent use (block 615). A discussion of the adjustments to the reference reset sequence is provided in detail below. The computations may be repeated for all possible micromirror tilt angles or a subset of all possible micromirror tilt angles, depending on memory storage restrictions, for example.

With reference now to FIG. 7, there is shown a diagram illustrating an algorithm 700 for use in the selection of a micromirror operating temperature and/or reset sequence based on a desired micromirror tilt angle. When a micromirror is to be tilted to a particular tilt angle, such as when a controller may need to display image data with a certain bit weight, focus depth, or so on, the controller may begin with receiving a desired tilt angle (block 705). The controller may have received an actual tilt angle, such as 11.5 degrees, or a tilt angle offset from a reference tilt angle, such as −0.3 degrees, for example. The reference tilt angle may be a tilt angle of micromirrors resulting from the application of a reference reset sequence.

The controller may then reference a memory to access a set of reset sequences and/or micromirror operating temperatures that may be indexed by tilt angle, such as the reset sequences and/or micromirror operating temperatures created with the algorithm 600 and then stored in a memory of the display system (block 710). If the controller finds a combination of micromirror operation temperature and/or reset sequence that may tilt the micromirror to the desired tilt angle, then the controller may then retrieve the micromirror operating temperature and/or reset sequence and provide them to the DMD (block 715).

However, if the desired tilt angle does not have a corresponding micromirror operating temperature and/or reset sequence, then the controller may have to use a micromirror operating temperature and/or reset sequence that may tilt the micromirror to the closest tilt angle and then the controller may need to make further adjustments to them (the micromirror operating temperature and/or the reset sequence) so that the micromirror may tilt to the desired tilt angle (block 720). For example, the controller may need to perform interpolation on certain values in the reset sequence, such as the bias voltage level, memory cell voltage level, the micromirror operating temperature, and so forth.

With reference back to FIG. 6b, the diagram illustrates a detailed view of the computing of the adjustment to micromirror operating temperature and/or the reference reset sequence (block 610). The computing of the adjustment to micromirror operating temperature and/or the reference reset sequence may begin with a computation of a tilt angle difference between the required tilt angle and a reference tilt angle (block 620). The reference tilt angle may be a micromirror's tilt angle for a reference operating temperature and/or reset sequence. For example, the reference tilt angle may be the micromirror's tilt angle when the reference operating temperature and/or reset sequence includes the following parameters: micromirror operating temperature may be about 25 degrees Celsius, bias voltage level is about 20 V, no memory cell state flipping, no memory cell voltage level adjustment, no modulation of the bias voltage, and so forth. The tilt angle difference may then simply be the reference tilt angle minus the required tilt angle, for example.

With the tilt angle difference computed in block 620, a check may then be made by referencing the adjustments to the operating temperature and the reference reset sequence stored in the memory 235 to determine if a single modification to the micromirror operating temperature and/or reference reset sequence will achieve a change in the micromirror tilt angle substantially equal to the tilt angle difference (block 625). If there is a single modification to the micromirror operating temperature and/or reference reset sequence, such as an adjustment to the micromirror operating temperature, bias voltage level, memory cell state flipping, memory cell voltage level adjustment, modulating the bias voltage level, and so on, then the adjustment may be applied to the micromirror operating temperature and/or the reference reset sequence (block 630).

If no single modification to the micromirror operating temperature and/or the reference reset sequence will achieve the change in the micromirror tilt angle substantially equal to the tilt angle difference, then it may be necessary to combine several adjustments to the reference reset sequence to achieve the change in the micromirror tilt angle (block 635). An iterative approach may be used to determine the adjustments needed. For example, cycling through a set of possible values for each of the modifications to the micromirror operating temperature and/or the reference reset sequence until a combination achieves the desired change in micromirror tilt angle is found. Alternatively, for a particular DMD design, the manufacturer may have a table of modifications of the micromirror operating temperature and/or the reference reset sequence and the resulting change in the micromirror tilt angle, then using a tilt angle difference or a required micromirror tilt angle, an adjusted reference reset sequence may be retrieved. With the adjustments to the reference reset sequence found, the adjustment may be applied to the micromirror operating temperature and/or the reference reset sequence (block 630).

With reference now to FIGS. 8a and 8b, there are shown diagrams illustrating the operation of a display system utilizing a digital micromirror device. It may be possible to illuminate a DMD of a display system continually or only when the DMD's micromirrors have settled to their desired positions. The diagram shown in FIG. 8a illustrates the operation 800 of a display system wherein the DMD is continually illuminated. The operation of the display system may begin with bringing the DMD to an adjusted micromirror operating temperature (block 803). A technique that may be used to rapidly bring the DMD to an operating temperature may be to illuminate the DMD with light from a light source while maintaining the DMD's micromirrors in an off position. The warming of the DMD may be accelerated if the cooling system of the DMD is powered down or reduced. The adjusted micromirror operating temperature may be a reference micromirror operating temperature or an operating temperature determined to regulate a tilt angle of the micromirrors in the DMD.

If the DMD has not already been illuminated, then the DMD may then be illuminated with light from a light source (block 805). The light may be narrowband or wideband and coherent or non-coherent. Once illuminated, the DMD's memory cells may be loaded with image data (block 810) and then an appropriate reset sequence may be applied to the DMD (block 815). Furthermore, the operating temperature of the DMD may be measured and adjusted as necessary (block 817). The operating temperature of the DMD may be measured and adjusted as necessary by the micromirror operating temperature unit 232 of the controller 230, for example. The controlling of micromirror operating temperature, loading of the image data, the maintaining of the DMD operating temperature, and the application of the reset sequences may repeat (block 820) as long as the display system continues in normal operation.

Illuminating a DMD of a display system only after it has settled may help to reduce stray light that may negatively affect image quality, by reducing contrast ratio, for example. Referring now to FIG. 8*b*, the operation 850 of the display system may begin with bringing the DMD to an adjusted micromirror operating temperature (block 851), followed by turning off any illumination of the DMD (block 852). This may involve turning off a light source of the display system or blocking light from the light source from reaching the DMD with a mechanical or electrical shutter, for example. Then, the DMD's memory cells may be loaded with image data (block 855) and then an appropriate reset sequence may be applied to the DMD (block 860). While the reset sequence is being applied and after the micromirrors of the DMD have settled, the DMD may be illuminated with light from a light source of the display system (block 865). Furthermore, the operating temperature of the DMD may be measured and adjusted as necessary (block 867). The turning off of the DMD illumination, the loading of the image data, the application of the reset sequence, the illumination of the DMD, and the maintaining of the DMD operating temperature may repeat (block 870) as long as the display system continues in normal operation.

Although the embodiments and their advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for adjusting a reset sequence of a digital micromirror device, the method comprising:
   determining a desired tilt angle corresponding to a first rest position of mirrors of the digital micromirror device to project an image onto a display plane;
   adjusting voltage potentials of signals in a reference reset sequence thereby creating an adjusted reset sequence, wherein the reference reset sequence has a reference tilt angle corresponding to a second rest position to project an image onto the display plane, wherein the adjustments alter a voltage potential difference between the mirrors of the digital micromirror device and respective address lines, and wherein the adjustments reposition the mirrors from the reference tilt angle to the desired tilt angle; and
   saving the adjusted reset sequence.

2. The method of claim 1, wherein the adjusting comprises modulating the reference reset sequence with a digital function, an analog function, or combinations thereof.

3. The method of claim 1, wherein the adjustments to the reference reset sequence are selected from a group consisting of: changing a micromirror bias voltage level, flipping a state of a memory cell associated with an individual micromirror, adjusting a voltage potential of memory cell address lines, and combinations thereof.

4. The method of claim 3, wherein the flipping the state of a memory cell occurs prior to a loading of a memory cell with data for a subsequent reset sequence.

5. The method of claim 1, wherein the adjusting of the reference reset sequence comprises replacing the voltage potentials with voltage potentials selected from a set of fixed voltage potentials.

6. The method of claim 1, wherein the adjusting of the reference reset sequence comprises replacing the voltage potentials with voltage potentials selected from a substantially continuous set of voltage potentials between a first voltage potential and a second voltage potential.

7. The method of claim 1, further comprising, after the determining, computing a tilt angle difference between the desired tilt angle and the reference tilt angle, and wherein the adjusting comprises adjusting the voltage potentials of signals in the reference reset sequence so that the mirrors are repositioned by an amount substantially equal to the tilt angle difference.

8. The method of claim 1, wherein the adjusting further comprises adjusting an operating temperature of the mirrors of the digital micromirror device.

9. A method for positioning mirrors in a digital micromirror device to a tilt angle, the method comprising:
   receiving the tilt angle for a first state;
   altering reference operating conditions of the digital micromirror device for the first state, wherein the altered operating conditions are based on the tilt angle and the altering comprises adjusting an operating temperature of the mirrors of the digital micromirror device; and
   applying the altered operating conditions to the digital micromirror device.

10. The method of claim 9, further comprising, prior to the altering, retrieving the adjustment to the operating temperature from a memory.

11. A method for positioning mirrors in a digital micromirror device to a tilt angle, the method comprising:
    receiving the tilt angle for a first state;
    altering reference operating conditions of the digital micromirror device for the first state, wherein the altering comprises adjusting a reset sequence, thereby creating an adjusted reset sequence, so that when the adjusted reset sequence is applied to the digital micromirror device, the mirrors are positioned to an angle substantially equal to the tilt angle; and
    applying the altered operating conditions to the digital micromirror device.

12. The method of claim 11, wherein the tilt angle comprises a desired final tilt angle for the mirrors in the digital micromirror device, and wherein the method further comprises, after the receiving, determining a change in tilt angle from a current tilt angle and the desired final tilt angle.

13. The method of claim 12, wherein the adjusting of the reset sequence is based on the change in tilt angle.

14. The method of claim 11, further comprising, after the receiving, retrieving the adjustments from a memory.

15. The method of claim 11, further comprising, prior to the receiving:
    computing adjustments to the reset sequence for a variety of different tilt angles; and
    storing the adjustments to a memory.

16. The method of claim 11, wherein the adjustments to the reset sequence are selected from a group consisting of: altering a micromirror bias voltage level, flipping a state of a memory cell associated with an individual micromirror, adjusting a voltage potential of memory cell address lines, modulating the micromirror bias voltage level, and combinations thereof.

17. A system comprising:

a light source;

an array of light modulators positioned in a light path of the light source after the light source, the array of light modulators configured to produce images by modulating light from the light source based on image data on a display plane; and a controller electronically coupled to the array of light modulators and to the light source, the controller configured to load image data into the array of light modulators and to alter a reset sequence to the array of light modulators, wherein the reset sequence is altered to achieve a desired tilt angle for micromirrors in the array of light modulators, the desired tilt angle being used to position the micromirrors to reflect light onto the display plane, and wherein a portion of the reset sequence corresponding to while the desired tilt angle is achieved is altered.

18. The system of claim 17, wherein the controller comprises:

a line driver circuit coupled to the array of light modulators, the line driver circuit configured to assert voltage potentials on bias voltage signal lines and memory address lines of micromirrors in the array of light modulators, wherein the voltage potentials are based on a desired tilt angle for the micromirrors; and an operating temperature unit coupled to the array of light modulators, the operating temperature unit configured to sense an operating temperature of the array of light modulators and to adjust the operating temperature of the array of light modulators.

19. The system of claim 17, wherein the line driver circuit is further configured to flip a state of memory address lines of the micromirrors and to modulate the voltage potential on the bias voltage signal lines of the micromirrors.

* * * * *